United States Patent
Poola et al.

(10) Patent No.: US 10,063,417 B2
(45) Date of Patent: Aug. 28, 2018

(54) AUTOMATICALLY GROUPING, AUTHENTICATING, AND PROVISIONING ACCESS POINTS USING CLOUD-BASED MANAGEMENT OF WLAN INFRASTRUCTURE

(71) Applicant: EXTREME NETWORKS, INC., San Jose, CA (US)

(72) Inventors: Jeelan Basha Poola, Karnataka (IN); Davis Kochery, Karnataka (IN); Dominic Velikakath Peter, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 246 days.

(21) Appl. No.: 14/844,064

(22) Filed: Sep. 3, 2015

(65) Prior Publication Data
US 2017/0070390 A1  Mar. 9, 2017

(51) Int. Cl.
| | |
|---|---|
| H04L 12/24 | (2006.01) |
| H04W 8/00 | (2009.01) |
| H04W 12/06 | (2009.01) |
| H04L 29/08 | (2006.01) |

(Continued)

(52) U.S. Cl.
CPC ...... *H04L 41/0846* (2013.01); *H04L 41/0806* (2013.01); *H04L 63/0876* (2013.01); *H04L 67/34* (2013.01); *H04W 8/005* (2013.01); *H04W 12/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0129291 A1 | 5/2009 | Gupta et al. | |
| 2010/0189005 A1* | 7/2010 | Bertani | H04W 74/02 370/252 |

(Continued)

FOREIGN PATENT DOCUMENTS

EP   1763177 A1   3/2007

OTHER PUBLICATIONS

International Search Report and Written Opinion for corresponding International Patent Application No. PCT/US2016/036321 dated Jul. 29, 2016.

*Primary Examiner* — Christine Duong
(74) *Attorney, Agent, or Firm* — Haley Guiliano LLP

(57) ABSTRACT

Disclosed herein are systems and methods for automatically grouping, authenticating, and provisioning access points using cloud-based management of wireless-local-area-network (WLAN) infrastructure. In an embodiment, a given site has a master access point that is manually configured with an organization-and-site-specific master-access-point configuration for providing service in a WLAN. Additional access points installed for operation transmit self-identifying messages to neighboring access points. Each access point compiles information about its neighbor access points in access-point neighbor lists. The access-point neighbor lists are received and used by a cloud-based WLAN-management service to identify the associated master access point and to provision unauthenticated access points using the correct organization-and-site-specific master-access-point configuration.

13 Claims, 7 Drawing Sheets

(51) Int. Cl.
*H04L 29/06* (2006.01)
*H04W 84/12* (2009.01)

(56) References Cited

U.S. PATENT DOCUMENTS

| | | | |
|---|---|---|---|
| 2014/0328190 A1* | 11/2014 | Lord | H04W 24/08 370/252 |
| 2015/0036488 A1 | 2/2015 | Mettu et al. | |
| 2015/0201370 A1 | 7/2015 | Desai et al. | |

* cited by examiner

AUTOMATICALLY GROUPING, AUTHENTICATING, AND PROVISIONING ACCESS POINTS USING CLOUD-BASED MANAGEMENT OF WLAN INFRASTRUCTURE

BACKGROUND OF THE INVENTION

The use of wireless local area networks (WLANs), also known generally as Wi-Fi networks, by organizations (a.k.a. enterprises) of all sizes has become increasingly widespread. The performance specifications of Wi-Fi networks have improved substantially as the IEEE 802.11 standard continues to evolve. Wi-Fi networks are typically easier and cheaper to install than are wired networks. Wi-Fi networks also offer service to mobile clients. Connections to devices are easily added and removed. It is not difficult to see why Wi-Fi is the network infrastructure of choice for many organizations.

One task that remains cumbersome in the installation and/or upgrading of a Wi-Fi network is the configuration and provisioning of new access points at a given site. The number of access points needed at a given site of an organization (e.g., a business) can vary from one or a few to a large number. An organization may have a site that covers a small area in which client devices need to connect, such that one or a few access points would provide sufficient service. On the other hand, a site may be a large factory, a multi-level building, or even a campus, requiring the installation of many access points throughout the site. A given site may also involve different departments or sub-divisions of the organization, such that management of the Wi-Fi network is made easier by grouping access points accordingly. As the number of access points used by an organization at a given location and/or the number of locations in which an organization operates Wi-Fi networks increases, the task of configuring and provisioning the access points becomes more and more difficult.

Access points are typically provided with a basic or default set of operating parameters that enable the devices to be operational upon power-up while connected to an enterprise network of an organization. The process of configuring an access point typically requires assigning a set of configuration parameters that determine the operation of the access point as a member of a group of access points operated by a given organization at a given location. Currently, access points are configured manually. That is, when a new access point is added to a site, its configuration parameters are selected and manually provisioned into the access point.

Some organizations use cloud-based services to manage their Wi-Fi infrastructure, which may extend across multiple locations. When someone at a given site of a given organization attempts to activate a new (or repurposed, relocated, or the like) access point, that access point may programmatically connect with an associated cloud-based WLAN-management service (e.g., to one or more servers operated in connection with such a service). Unless detailed information is manually provided by an administrator that is manually configuring the new access point, the cloud-based WLAN-management service would not be able to determine with which location of which organization the new access point should be associated, and would not therefore be able to identify a set of access-point-configuration parameters (e.g., service set identifier (SSID), security information (e.g., passcode), and the like) with which to provision the access point. Thus, typically, such access points need to be manually configured onsite. As the number of access points involved gets larger, the task becomes more and more tedious and time-consuming.

Accordingly, there is a need for systems and methods for automatically grouping, authenticating, and provisioning access points using cloud-based management of WLAN infrastructure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
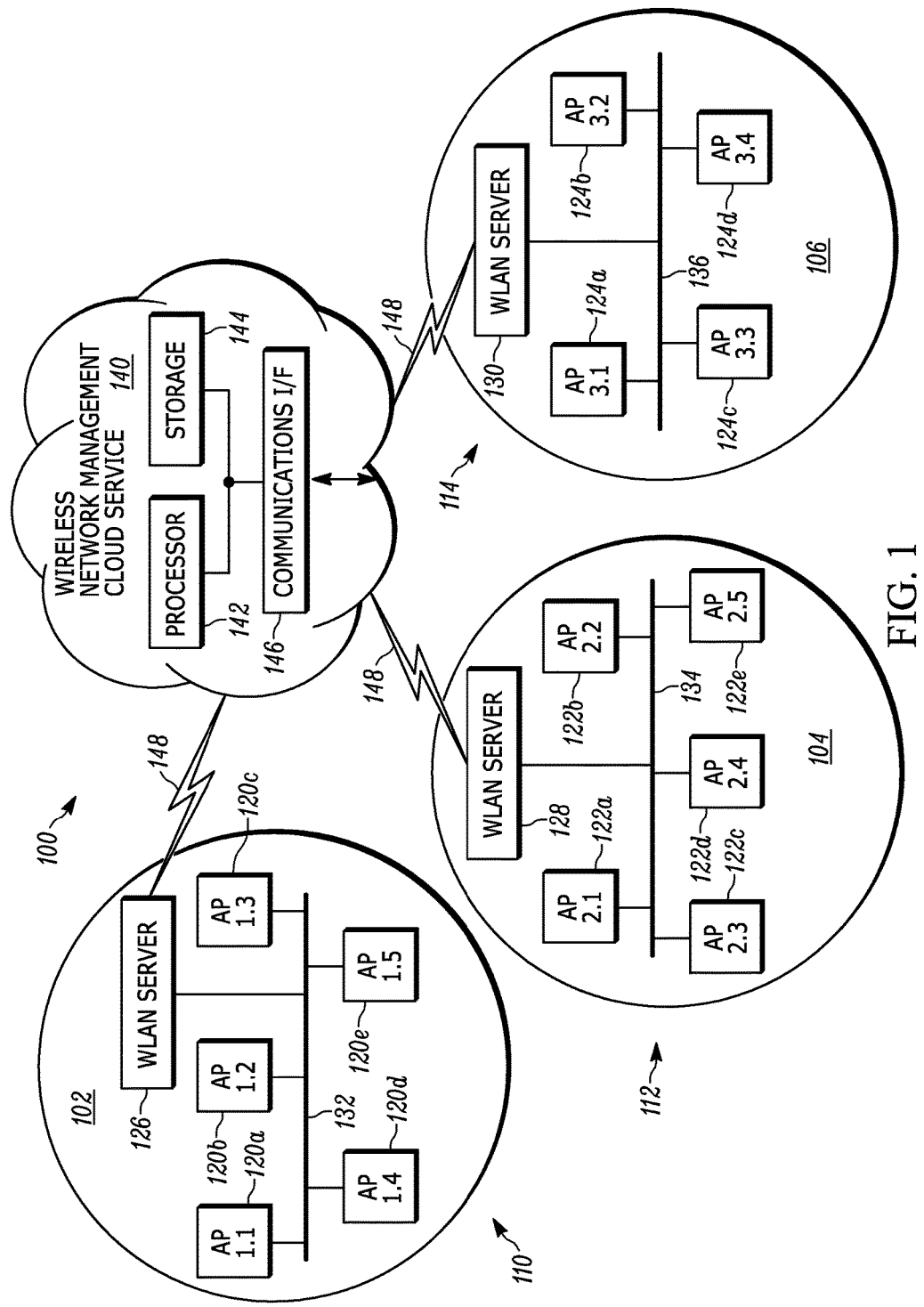
FIG. 1 is a schematic diagram depicting several geographical areas that each have a WLAN that includes multiple access points configured using a cloud-based WLAN-management service, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for automatically grouping, authenticating, and provisioning access points using cloud-based management of WLAN infrastructure.

One embodiment takes the form of a first process that includes receiving a first-access-point neighbor list from a first access point, which has a first-access-point configuration, as well as receiving a second-access-point neighbor list from a second access point. The first process also includes making a matching determination, which includes (i) making a determination that the first-access-point neighbor list includes an identifier of the second access point and (ii) making a determination that the second-access-point neighbor list includes an identifier of the first access point. The first process also includes, responsive to making the matching determination, provisioning the second access point with the first-access-point configuration.

Another embodiment takes the form of a first system that includes a communication interface, a processor, and data storage containing instructions executable by the processor for causing the first system to carry out at least the functions described in the preceding paragraph.

In at least one embodiment, making the matching determination further includes making a determination that the first access point is an authenticated access point. In at least one such embodiment, making the determination that the first access point is an authenticated access point includes making a determination that the first access point is a master access point.

In at least one embodiment, the first-access-point configuration contains one or more of an SSID, a WLAN security configuration, an operating frequency band, a dynamic host configuration protocol (DHCP) server configuration, a client-address assignment mode, a WLAN-rate-limiting setting, a virtual local area network (VLAN) configuration, a firewall configuration, a network address translation (NAT) configuration, an application-visibility configuration, a wireless-radio configuration, a physical-port configuration, a radio-frequency-(RF)-management configuration, a certificate configuration, and an Internet Protocol (IP) security (IPSec) configuration.

In at least one embodiment, making the matching determination further includes making a determination that the second access point is an unauthenticated access point.

In at least one embodiment, making the matching determination further includes making a determination that the second access point is a relocated access point.

In at least one embodiment, the neighbor lists are wired-network-based neighbor lists.

In at least one embodiment, the neighbor lists are wireless-beacon-based neighbor lists.

In at least one embodiment, the first process further includes (i) receiving a third-access-point neighbor list from a third access point, where the third access point has a third-access-point configuration, where the third-access-point neighbor list includes an identifier of the second access point, and where the second-access-point neighbor list includes an identifier of the third access point; in at least one such embodiment, making the matching determination further includes selecting, based on one or more selection criteria, the first-access-point configuration over the third-access-point configuration for provisioning the second access point. In at least one such embodiment, the one or more selection criteria includes signal-strength data. In at least one such embodiment, the one or more selection criteria includes information conveyed over at least one wired network connection.

In at least one embodiment, making the matching determination further includes confirming that neither the first access point nor the second access point is a rogue access point.

Another embodiment takes the form of a second process that includes sending, from an access point, an access-point-identification message over a communication interface, where the access-point-identification message includes an access-point identifier that is associated with the access point. The second process also includes receiving, over the communication interface, a neighboring-access-point-identification message from at least one neighboring access point, where each received neighboring-access-point-identification message includes a respective neighboring-access-point identifier associated with a corresponding neighboring access point. The second process also includes sending, over the communication interface, an access-point report to a cloud-based WLAN-management service for provisioning of one of (i) the access point and (ii) one of the at least one neighboring access points, where the access-point report includes the access-point identifier and the at least one neighboring-access-point identifier.

Another embodiment takes the form of a second system that includes a communication interface, a processor, and data storage containing instructions executable by the processor for causing the second system to carry out at least the functions described in the preceding paragraph.

In at least one embodiment, the access-point report is for provisioning the access point. In at least one such embodiment, the second process further includes (i) identifying neighboring access points that are master access points by detecting at least one access-point attribute operative to identify the corresponding neighboring access point as a master access point in the received at least one neighboring-access-point-identification message and (ii) excluding from the access-point report any neighboring-access-point identifiers of neighboring access points not identified as master access points.

In at least one embodiment, the access-point report is for provisioning one of the at least one neighboring access points. In at least one such embodiment, the second process further includes (i) prior to sending the access-point-identification message, receiving a predetermined set of access-point attributes to configure the access point as a master access point and (ii) including in the access-point-identification message at least one access-point attribute that identifies the access point as a master access point.

In at least one embodiment, the communication interface is a wired-network interface.

In at least one embodiment, the communication interface is a wireless-network interface.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 is a schematic diagram depicting several geographical areas that each have a WLAN that includes multiple access points configured using a cloud-based WLAN-management service, in accordance with some embodiments. Indeed, FIG. 1 depicts a system 100 operating in several geographical areas 102, 104, and 106, each having a WLAN 110, 112, 114. Each WLAN 110, 112, 114 includes a plurality of access points configured using a cloud-based WLAN-management service 140. The first WLAN 110 includes access points 120a-120e for providing wireless network access to mobile clients (not shown) in the first area 102. Each of the access points 120a-120e in the first area 102 is connected to a wired network 132 (by Ethernet, for example) to provide connectivity to other private and public data networks, including for example, the Internet. The first WLAN 110 includes a WLAN server 126 to provide such connectivity to data networks, and to cloud services such as the cloud-based WLAN-management service 140.

The second WLAN 112 includes access points 122a-122e for providing wireless network access to mobile clients (not shown) in the second area 104. Each of the access points 122a-122e in the second area 104 is connected to a wired network 134 (by Ethernet, for example) to provide connectivity to other private and public data networks, including for example, the Internet. The second WLAN 112 includes a WLAN server 128 to provide such connectivity to data networks, and to cloud services such as the cloud-based WLAN-management service 140.

The third WLAN 114 includes access points 124a-124d to provide wireless network access to mobile clients (not shown) in the third area 106. Each of the access points 124a-124d in the third area 106 is connected to a wired network 136 (by Ethernet, for example) to provide connectivity to other private and public data networks, including for example, the Internet. The third WLAN 114 includes a WLAN server 130 to provide such connectivity to data networks, and to cloud services such as the cloud-based WLAN-management service 140. Each of the WLAN servers 126, 128, 130 may communicate with the cloud-based WLAN-management service 140 over any suitable type of data network 148 operable to connect to services provided by cloud computing.

Each group 120, 122, 124 of access points shown in FIG. 1 is configured using the cloud-based WLAN-management service 140. Any suitable cloud service model (e.g., Software as a Service ["SaaS"], Platform as a Service ["PaaS"], and Infrastructure as a Service ["IaaS"]) may be used to implement the cloud-based WLAN-management service 140. In an example implementation as shown in FIG. 1, the cloud-based WLAN-management service 140 operates on a cloud infrastructure that includes processing resources, illustrated in FIG. 1 by a processor 142, data storage resources, illustrated in FIG. 1 by a storage medium 144, and a communications interface 146. A software application may be implemented to operate using the cloud infrastructure as the cloud-based WLAN-management service 140 utilizing the cloud processor 142. The cloud storage medium 144 may be used to store software components of the cloud-based WLAN-management service 140 and to store management and configuration data for the WLANs 110, 112, 114 managed by the cloud-based WLAN-management service 140.

The system 100 shown in FIG. 1 may be used by an organization to configure and manage one or more WLANs in different geographical locations. As an example, a company may operate multiple department stores in different locations across the country and may provide data connectivity for its employees' client devices by installing WLANs in each location. The company may employ the cloud-based WLAN-management service 140 to configure access points at the WLANs in its various locations. As examples, the cloud-based WLAN-management service 140 may be configured by the company or by a third party for exclusive use by the company. The cloud-based WLAN-management service 140 may also be configured for use by many companies so that at any given time, access points belonging to any of the companies may be communicating to the cloud-based WLAN-management service 140 for authentication, provisioning, and/or the like.

In an example implementation, a selected one of the access points in each of the WLANs 110, 112, 114 is manually configured for service according to a selected set of configuration parameters that is particular to the respective WLAN on which it resides. This selected access point shall be referred to herein—with respect to the respective WLAN on which it resides—as a master access point. The selected set of configuration parameters may be selected to provide service in a desired manner to wireless-communication-capable client devices.

The configuration parameters may be selected from any set of suitable operating or service parameters. Example sets of configuration parameters may be generated by defining settings for parameters that are to be loaded into an access point. Typically, such parameters are manually stored in the access-point memory or registers using a terminal and hardware and software components having a connection to the access point. Examples of the types of parameters that may be part of a set of configuration parameters are listed below:

1. WLAN SSID
2. WLAN security configuration: Open, pre-shared key (PSK), 802.1x (Radius server, shared secret etc.)
3. WLAN frequency band
4. DHCP server configuration
5. Client-IP-address assignment mode
   a. Bridge mode
   b. DHCP server mode
6. WLAN rate limiting
7. Voice VLAN, client roam assistance, client-to-client communication
8. VLAN configurations
9. Firewall configuration
   a. IP access list rules
   b. MAC access list rules
10. NAT configurations
11. Application visibility rules and schedules
12. Wireless radio configurations
13. Physical port (GE1, GE2 etc.) configurations
14. RF Management
15. Certificates
16. IPSec configurations New access points typically have default values for parameters of the type listed above, which may be provided during the manufacturing of the device or at any time before its first deployment. Meaningful values for such parameters are set by configuration of the access point for use in a specific location and for a specific owner (e.g. a company, enterprise, organization, etc.) of the WLAN. For example, an access point would not have a parameter that defines a security protocol for clients that communicate with the access point. A pre-shared key or some other security mechanism would be programmed into the access point during configuration of the access point. And certainly other examples could be listed as well.

For a WLAN operating under the IEEE 802.11 standard, the SSID of an access point may be a default value that may identify the access point as new and unauthenticated. In the case of an access point that has been deployed in a WLAN, but is being re-deployed in another WLAN, the access point would typically have an SSID that enabled it to operate in the prior WLAN but not in the new WLAN. Under IEEE 802.11, an SSID is a case sensitive, 32-alphanumeric-character (at most) unique identifier attached to the header of packets sent over a WLAN and that acts as a WLAN identifier when a mobile device tries to connect to the basic service set (BSS)—a component of the IEEE 802.11 WLAN architecture. The SSID differentiates one WLAN from another; so all access points and all devices attempting to connect to a specific WLAN must use the same SSID to enable effective roaming. As part of the association process, a wireless network interface card (NIC) must have the same SSID as the access point or it will not be permitted to join the BSS. In an embodiment, then, an authenticated access point in a WLAN at a specific location will have had its SSID modified with the SSID of the specific WLAN whereas as access point that identifies itself with a different SSID has not been authenticated.

The SSID is one parameter that may be used to distinguish between authenticated and unauthenticated access points. Another parameter that may be used to distinguish between authenticated and unauthenticated access points is the OUI (Organizationally Unique Identifier) parameter, which may be part of an access point's MAC address. An authenticated access point may be identified as an access point having a specific OUI. In an example implementation, a configuration for a WLAN is defined using multiple configuration parameters to better identify access points authenticated with WLAN-owner-specific parameters. A set of configuration parameters may be identified for a WLAN and used to distinguish between an authenticated access point and an unauthenticated access point. This set of configuration parameters may be used to manually authenticate a master access point.

Figure 2:
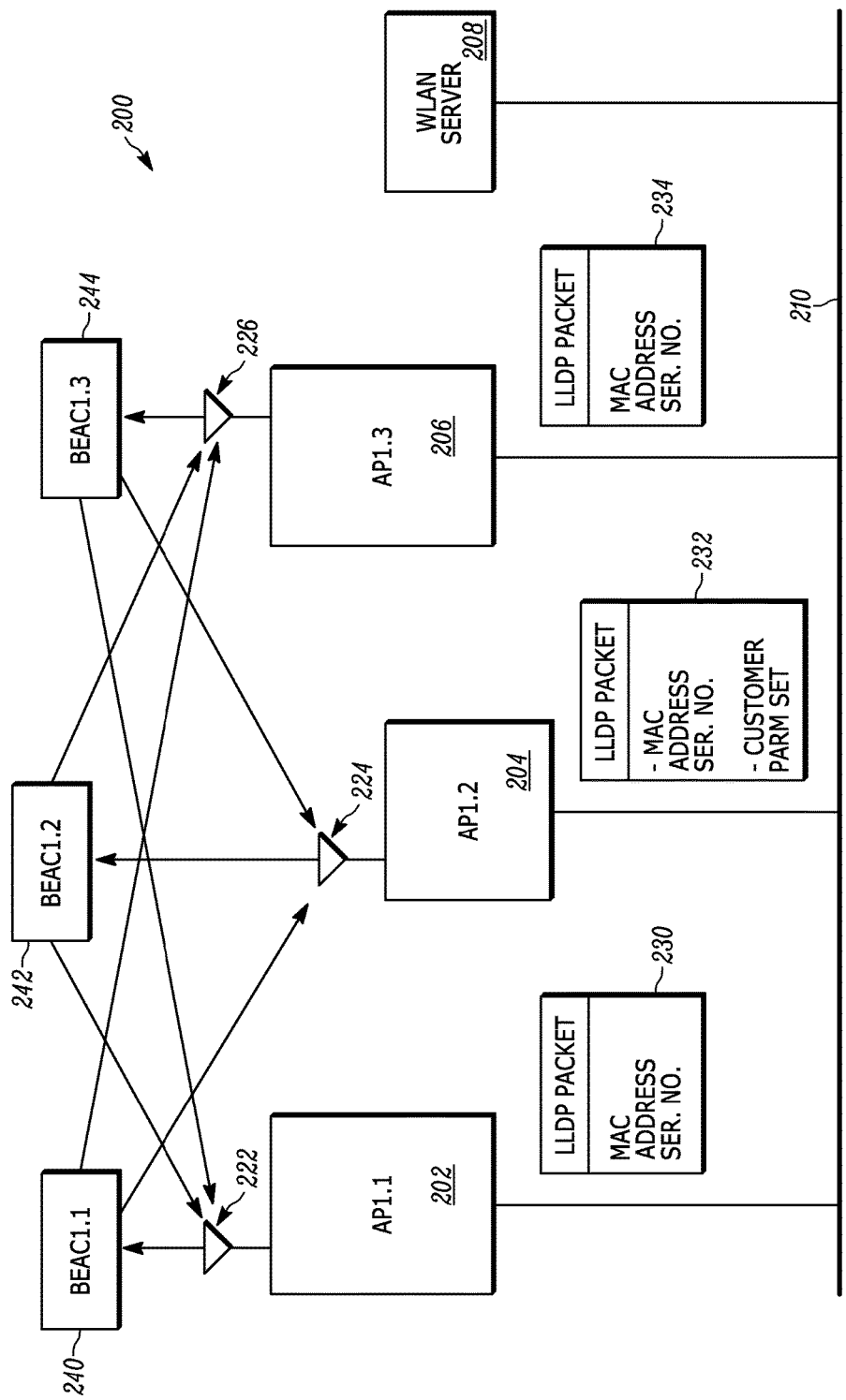
FIG. 2 is a schematic diagram illustrating operation of three access points in an area self-identifying to one another, in accordance with some embodiments.

FIG. 2 is a schematic diagram illustrating operation of three access points in an area self-identifying to one another, in accordance with some embodiments. Indeed, in accordance with at least one embodiment, when an access point is connected and operating in a WLAN, it transmits messages to other access points and other components connected to the WLAN. The messages may be transmitted over the wired network communication to which the access point is connected, or by radio transmissions. As depicted in FIG. 2, a WLAN 200 includes three access points. In particular, a first access point 202, a second access point 204, and a third access point 206 in the WLAN 200 communicate messages to one another over either a wired network 210 or via a radio transceiver 222, 224, 226 on each access point. A WLAN server 208 is shown connected to the WLAN 200 over the wired network 210 to provide data-network connections to a cloud service such as the cloud-based WLAN-management service 140 of FIG. 1.

In the example shown in FIG. 2, the messages transmitted over the wired network 210 may be communicated in accordance with the Linked Layer Description Protocol ("LLDP"), a protocol typically used by devices connected to data networks to identify themselves to other devices on a given data network. Standard or proprietary wireless network management protocols may be used as well. The LLDP messages have a standard format and contain a standard set of elements of information, such as the access point's Media Access Control (MAC) address. LLDP messages may also, however, be configured to contain a customized set of elements of information. This customized set of elements of information may include organization-specific type length value ("TLV") structure. An LLDP message from an unauthenticated access point may have a default structure containing (in some cases) only the access-point MAC address. An LLDP message from an access point that had previously been properly authenticated for operation in a different WLAN may include information that would not match configuration data for the new WLAN in which the access point is being deployed. And certainly other example situations could be listed here as well.

In the example scenario that is depicted in FIG. 2, the first access point 202 communicates a first LLDP message 230 over the wired network 210 to be received by the second access point 204 and the third access point 206. The first LLDP message 230 contains the MAC address of the first access point 202 and other information (not shown) that is included in a default LLDP message (which may be similar to an LLDP message communicated by an unauthenticated access point). The second access point 204 communicates a second LLDP message 232 over the wired network 210 to be received by the first access point 202 and the third access point 206. The second LLDP message 232 contains the MAC address of the second access point 204 and custom configuration parameters for the WLAN 200. The third access point 206 communicates a third LLDP message 234 over the wired network 210 to be received by the first access point 202 and the second access point 204. The third LLDP message 234 contains the MAC address of the third access point 206 and other information (not shown) that is included in a default LLDP message.

Alternatively, or additionally in some embodiments (as is also shown in the example that is depicted in FIG. 2), the access points 202, 204, 206 may transmit self-identifying messages using their respective transceivers 222, 224, 226; such messages may be communicated in accordance with the IEEE 802.11 requirements for beacon messages, which communicate information formatted in a beacon frame; this information includes data such as a timestamp, a beacon interval indicating a time interval between beacon transmissions, capability information indicating the capability of the access point, the SSID of the access point, supported rates, and other items of information. Moreover, a given access point may be configured to have customized beacon messages with information reflecting the access point's configuration.

In the example that is depicted in FIG. 2, the first access point 202 sends a first beacon message 240 via its transceiver 222 to be received by the second access point 204 and the third access point 206 (assuming that those other access points are in signal range). Similar to the LLDP message 230 described above, the first beacon message 240 contains a default SSID value and any other information in a typical beacon message from an unauthenticated access point. The second access point 204 sends a second beacon message 242 via its transceiver 224 to be received by the first access point 202 and the third access point 206 (again, assuming that those other access points are in signal range). Similar to the LLDP message 232 described above, the second beacon message 242 contains a specific SSID value or other configuration parameters that identify the second access point as an authenticated—or as a master (and therefore also authenticated)—access point. The third access point 204 sends a third beacon message 244 via its transceiver 226 to be received by the first access point 202 and the second access point 204 (again, assuming that those other access points are in signal range). Similar to the LLDP message 234 described above, the third beacon message 244 contains a default SSID value and any other information in a typical beacon message from an unauthenticated access point. It is noted that, in communicating their beacon messages 240, 242, 244, the access points 202, 204, 206 may need to scan various or all supported channels used by the radios.

Thus, in the example that is depicted in FIG. 2, the second access point 204 communicates self-identifying messages 232 and/or 242 that identify the second access point 204 as having been authenticated for service. An access point that identifies itself as authenticated may be the master access point—for the WLAN 200—that has been manually authenticated with configuration parameters that are custom for the specific WLAN 200. An access point that identifies itself as authenticated may have been previously authenticated for service for the WLAN 200. An access point that identifies itself as authenticated may instead have been authenticated for service in a prior WLAN and is being re-deployed in the WLAN 200.

In an example, each access point receives broadcast messages (that are self-identifying messages with respect to the respective access points from which such messages were received) from its neighboring access points and compiles a neighbor list of the access points from which it received such messages. The neighbor list may include a set of configuration parameters received from each neighboring access point. Each access point then communicates the neighbor lists—along with which the transmitting access point also sends an identifier of itself—to the cloud-based WLAN-management service 140.

Figure 3:
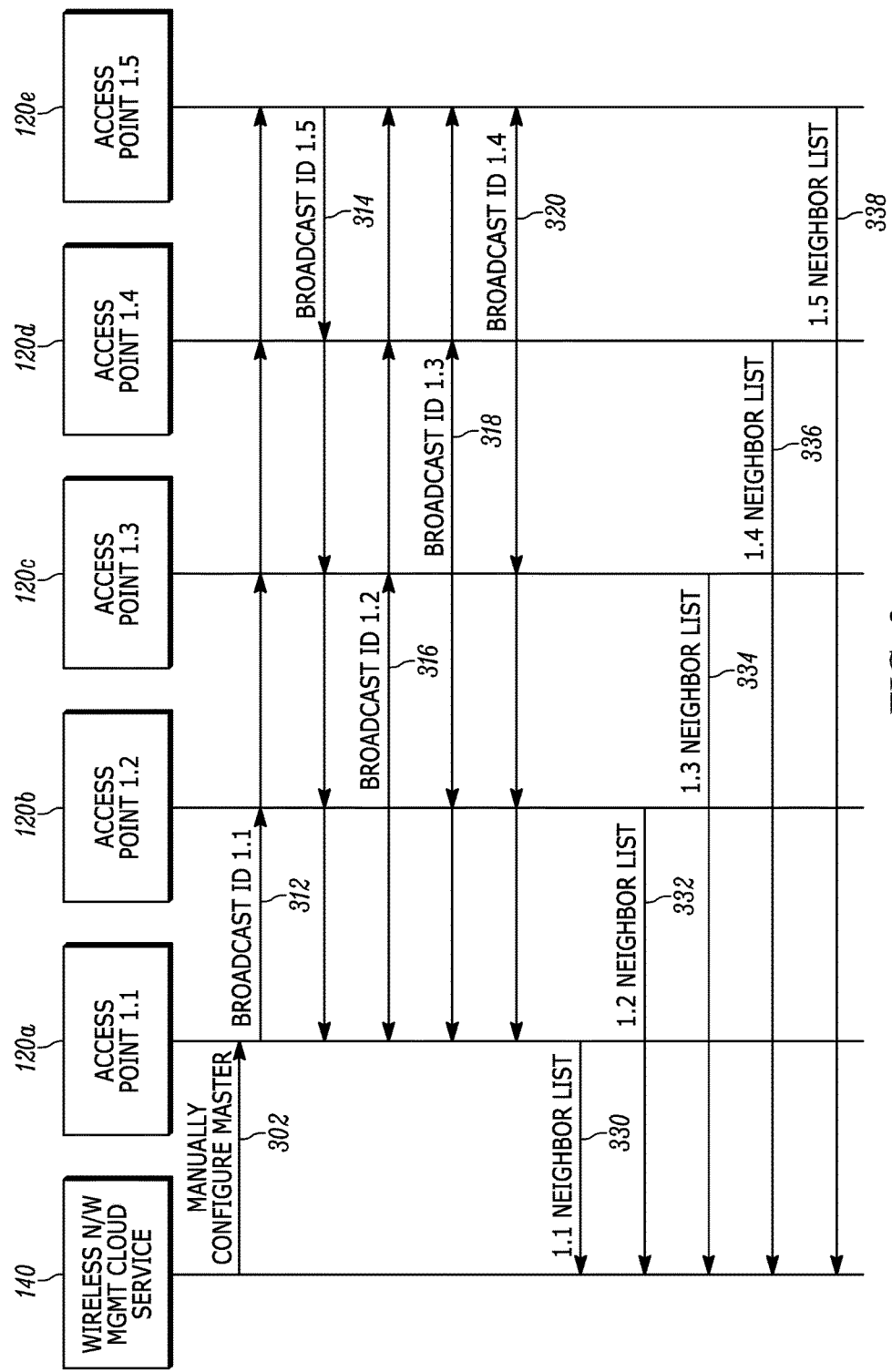
FIG. 3 is a diagram illustrating operation of one of the WLANs of FIG. 1 during authentication of the corresponding access points and communication with the cloud-based WLAN-management service of FIG. 1, in accordance with some embodiments.

FIG. 3 is a diagram illustrating operation of one of the WLANs of FIG. 1 during authentication of the corresponding access points and communication with the cloud-based WLAN-management service of FIG. 1, in accordance with some embodiments. Indeed, FIG. 3 illustrates an example of how a group of access points interact with the cloud-based WLAN-management service 140 of FIG. 1 during an initialization of a WLAN, or during an authentication of one or more new access points. For illustration, FIG. 3 depicts a message flow for the WLAN 110 in the first geographical area 102 of FIG. 1 during authentication of the access points 120a-120e and communication with the cloud-based WLAN-management service 140.

In the example of FIG. 3, all of the access points 120a-120e are presumed to initially be unauthenticated. A user may manually configure the first access point 120a with a set of configuration parameters that have been selected for the first WLAN 110 in the first geographical area 102. This manual configuration may occur at the cloud-based WLAN-management service 140 and then be downloaded to the first access point 120a at 302, as shown in FIG. 3. In other embodiments, this manual configuration of the access point 120a could occur onsite at the first geographical area 102 and then be uploaded to the cloud-based WLAN-management service 140, in which case the arrow 302 would point in the other direction. Either way, this manual configuration of the access point 120a, which then becomes the master access point for the first geographical area 102, may include an SSID, security information, one or more instances of the other types of access-point-configuration parameters that are enumerated above, and/or one or more other access-point-configuration parameters deemed suitable by those of skill in the art for a given implementation or context.

Each access point 120a-120e may then be installed in their location in the first geographical area 102 of the WLAN 110. Each access point 120a-120e begins to operate in the WLAN 110 by broadcasting self-identifying messages. The first access point 120a broadcasts an access-point-identification message 312 to be received by neighboring access points 120b-120e. The access point identification message 312 includes an access-point identifier identifying the first access point 120a. In the example in FIG. 3, the first access point 120a is broadcasting its access-point-identification message 312 after having been manually configured as the master access point. The access-point-identification message 312 includes an access-point identifier (e.g., MAC address, wireless MAC address, serial number, and/or the like) that uniquely identifies the first access point 120a. Each of the other access points 120b-120e receive the access-point-identification message 312 as a neighboring-access-point-identification message. The other access points 120b-120e store the information in the message 312 for inclusion in the respective neighbor-access-point list that each access point 120b-120e is respectively compiling.

The fifth access point 120e broadcasts a second access-point-identification message 314 that includes an access-point identifier of the fifth access point 120e. The fifth access point 120e is assumed for purposes of this example to be a never-before-used new access point. The access-point identifier in the second access-point-identification message 314 may be a default value. Each of the other access points 120a-120d receive the access-point-identification message 314 as a neighboring-access-point identification message and accordingly store the access-point identifier of the fifth access point 120e for inclusion in the respective neighbor-access-point list that each such access point 120a-120d is respectively compiling.

The second access point 120b, the third access point 120c, and the fourth access point 120d broadcast a third access-point-identification message 316, a fourth access-point-identification message 318, and a fourth access-point-identification message 320, respectively, that include an access-point identifier of the corresponding access points 120b-120d. The second, third and fourth access points 120b, 120c, 120d in the example in FIG. 3 are assumed to be new access points. The respective access-point identifiers in the second, third, and fourth access-point-identification messages 316, 318, 320 may be default values. Moreover, it is noted that the access-point-identification messages 312-320 may be broadcast in any order and may be broadcast repeatedly at regular and/or non-regular intervals.

As each access point 120a-120e compiles information about its neighbor access points, each builds an access-point report that includes an access-point identifier of the sender access point and its corresponding neighbor-access-point list (i.e., the list of access-point identifiers of each neighbor access point from which the sender access point received an access-point-identification message). Referring to FIG. 3, the first access point 120a sends a first neighbor list 330 to the cloud-based WLAN-management service 140. As described above, in this example, the first neighbor list 330 is from an access point 120a that has been configured as a master access point. The first neighbor list 330 may include access-point identifiers of each of the second, third, fourth and fifth access points. And it is noted that neighbor lists (a.k.a. access-point reports and the like) may include information about the sender access point and/or the neighboring access points of that sender access point in addition to the access-point identifiers. Such additional information could include one or more of the corresponding access point's operating parameters (e.g., SSID).

The second access point 120b sends a second neighbor list 332 to the cloud-based WLAN-management service 140. The third, fourth, and fifth access points 120c, 120d, 120e each send their neighbor lists 334, 336, 338 to the cloud-based WLAN-management service 140. In one example, each of the second, third, fourth, and fifth access points 120b-120e limit information in the access-point neighbor lists that they respectively send in order to reduce the amount of data being communicated to the cloud-based WLAN-management service 140. For example, in the matching process performed by the cloud service, new access points are matched with master access points, not with each other. Therefore, the neighbor lists communicated from new or unauthenticated access points need only include neighbor access points that are masters. The second neighbor list 332, the third neighbor list 334, the fourth neighbor list 336, and the fifth neighbor list 338 may each exclude the non-master access points and only include the first access point 120*a* as their neighbor. And certainly numerous other example implementations could be listed here as well.

The first neighbor list 330, the second neighbor list 332, the third neighbor list 334, the fourth neighbor list 336, and the fifth neighbor list 338 may also be configured to denote a source for the configuration parameters in each list. For example, if the neighbor lists 330-338 were configured from self-identifying information communicated over a wired network, the neighbor lists 330-338 may be wired-network neighbor lists identified as such by either adding an identifier, or by analysis of the configuration parameters as being of the type (e.g., LLDP) typically conveyed by wired communications. If the neighbor lists 330-338 were configured from self-identifying information communicated wirelessly, the neighbor lists 330-338 may be wireless-beacon-based neighbor lists identified by adding an identifier, or by the configuration parameters. For example, configuration parameters having an SSID are likely determined wirelessly, while those including MAC addresses are likely determined over wired network. And certainly other examples could be listed.

In at least one embodiment, the cloud-based WLAN-management service 140 uses each neighbor list 330-338 to identify trusted access points, which are access points authenticated for service in the WLAN 110 (in FIG. 1). The cloud-based WLAN-management service 140 then uses the configuration parameters of trusted access points to authenticate and provision unauthenticated access points.

Figure 4A:
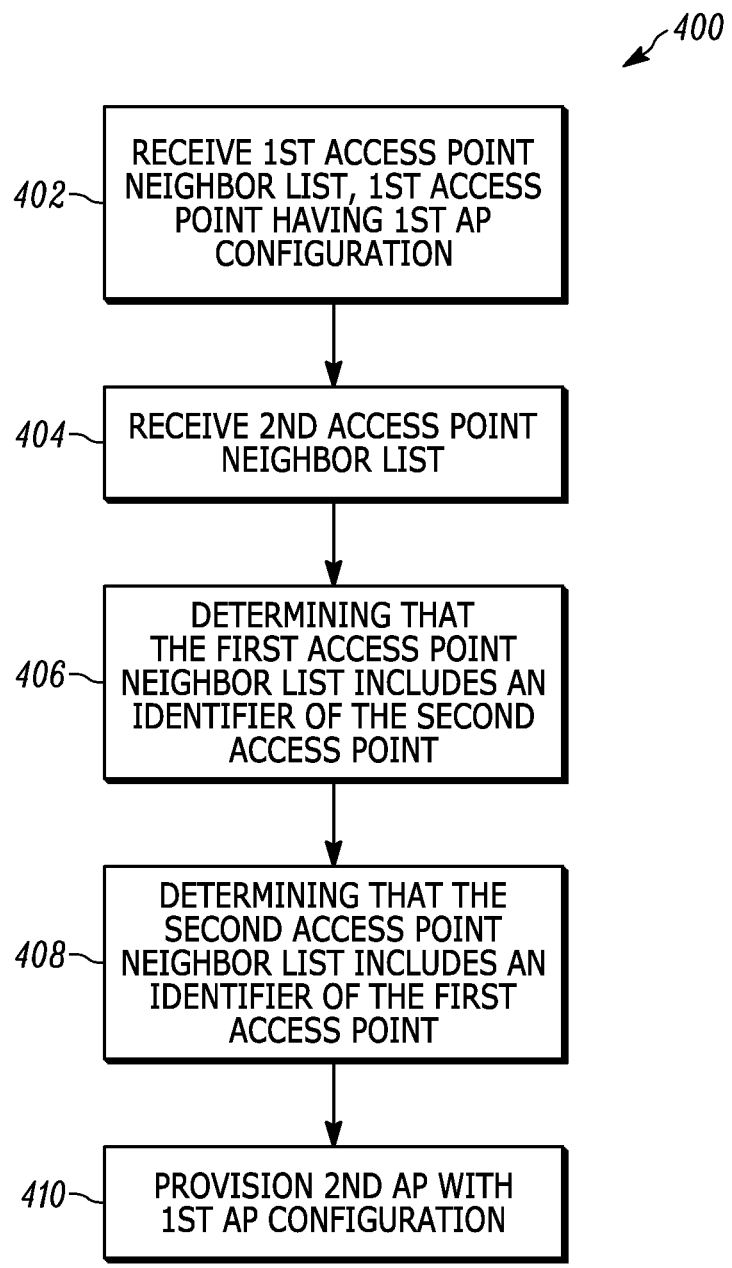
FIG. 4A is a flowchart depicting a first method, in accordance with some embodiments.

FIG. 4A is a flowchart depicting a first method, in accordance with some embodiments. Indeed, FIG. 4A is a flowchart illustrating operation of a method 400 of identifying, authenticating, and provisioning an unauthenticated access point in accordance with some embodiments. The method 400 illustrated in FIG. 4A is performed by a WLAN management cloud service such as the cloud-based WLAN-management service 140 described above with reference to FIG. 1 as part of a process of automatically authenticating and provisioning a group of access points for operation in a WLAN. It is presumed in this method that a master access point in the WLAN has previously been manually configured with configuration parameters for authentication in the group. The access points in the group are initialized and have broadcast access-point-identification messages to each other as described above. Each access point compiles access-point reports (i.e., neighbor-access-point lists) to send to the cloud-based WLAN-management service 140.

At step 402 in FIG. 4A, the cloud-based WLAN-management service 140 receives a first-access-point neighbor list from a first access point, which has a first-access-point configuration. In the example illustrated by FIG. 4A, the first access point is a master access point (but could be any previously authenticated access point), which is deemed a trusted access point. The first-access-point neighbor list includes an identifier for the first access point, and a list of identifiers of neighboring access points. At step 404, a second-access-point neighbor list is received from a second access point. The second access point in this example is a new (or otherwise unauthenticated) access point. The second-access-point neighbor list includes an identifier of the second access point, and a list of identifiers of the second access point's neighboring access points in the WLAN.

The second-access-point neighbor list is checked to determine whether the identifier of the first access point is in the second-access-point neighbor list. The first-access-point neighbor list is checked to determine whether the identifier of the second access point is in the first-access-point neighbor list. At step 406, the identifier of the first access point is determined to be included in the second-access-point neighbor list. At step 408, the identifier of the second access point is determined to be included in the first-access-point neighbor list. The inclusion of identifiers of the first and second access points in each other's neighbor lists indicates that the first and second access points received each other's self-identifying broadcast messages, indicating a close (wired and/or wireless) proximity between them. In addition, the first access point is a trusted access point as either a master access point or a previously authenticated access point. The new, second access point therefore is deemed to be meant to operate in the same WLAN as the first access point. At step 410, the second access point is provisioned with the first access-point configuration.

Figure 4B:
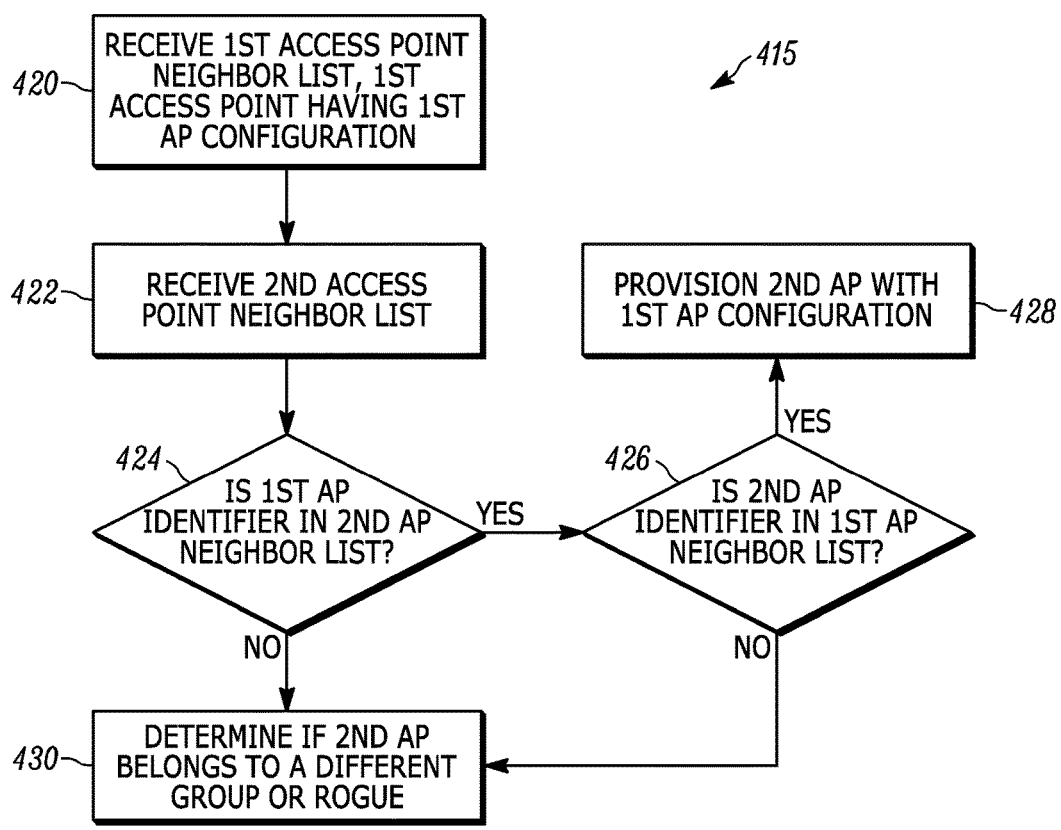
FIG. 4B is a flowchart depicting a second method, in accordance with some embodiments.

FIG. 4B is a flowchart depicting a second method, in accordance with some embodiments. Indeed, FIG. 4B is a flowchart illustrating operation of another method 415 of identifying, authenticating, and provisioning an un-authenticated access point in accordance with some embodiments. As with the method 400 described above with reference to FIG. 4A, the method 415 illustrated in FIG. 4B is performed by a cloud-based WLAN-management service such as the cloud-based WLAN-management service 140 described above with reference to FIG. 1 as part of a process of automatically authenticating and provisioning a group of access points for operation in a WLAN. It is presumed in this method that a master access point in the WLAN has been manually configured with configuration parameters for authentication in the group. The access points in the group are initialized and have broadcast access-point-identification messages to each other as described above with reference to FIGS. 3 and 4A. Each access point compiles access-point reports to send to the cloud-based WLAN-management service 140.

At step 420 in FIG. 4B, the cloud-based WLAN-management service 140 receives a first-access-point neighbor list from a first access point, which has a first-access-point configuration. In the example illustrated in FIG. 4B, the first access point is a master access point or an authenticated access point, which is deemed a trusted access point. The first-access-point neighbor list includes an identifier for the first access point, and a list of identifiers of neighboring access points. At step 422, a second-access-point neighbor list is received from a second access point. The second access point in this example is a new or unauthenticated access point. The second-access-point neighbor list includes an identifier of the second access point, and a list of identifiers of the second access point's neighboring access points in the WLAN.

At decision block 424, a check is made to determine whether an identifier of the first access point is in the second-access-point neighbor list. If the first access point is found in the second-access-point neighbor list, a check is made at decision block 426 to determine whether an identifier of the second access point is in the first-access-point neighbor list. If the first and second access points are identified in each other's neighbor lists, it can be inferred that the first and second access points received each other's self-identifying broadcast messages, indicating a close (wired and/or wireless) proximity between them. In addition, the first access point is a trusted access point as either a master access point or a previously authenticated access point. The new, second access point therefore is intended to operate in the same WLAN as the first access point. At step 428, the second access point is provisioned with the first-access-point configuration.

If at decision block 424, the first access point is not in the second-access-point neighbor list, or if at decision block 426, the second access point is not in the first-access-point neighbor list, it is determined that the second access point is not intended for operation in the WLAN that includes the first access point. The method may determine at step 430 whether the second access point belongs to a different group for the same network owner, or if it is part of a network belonging to a different owner, or perhaps some other possibility. As one example, the second access point may be deemed to be a rogue access point. And certainly other example implementations could be listed here.

Figure 5:
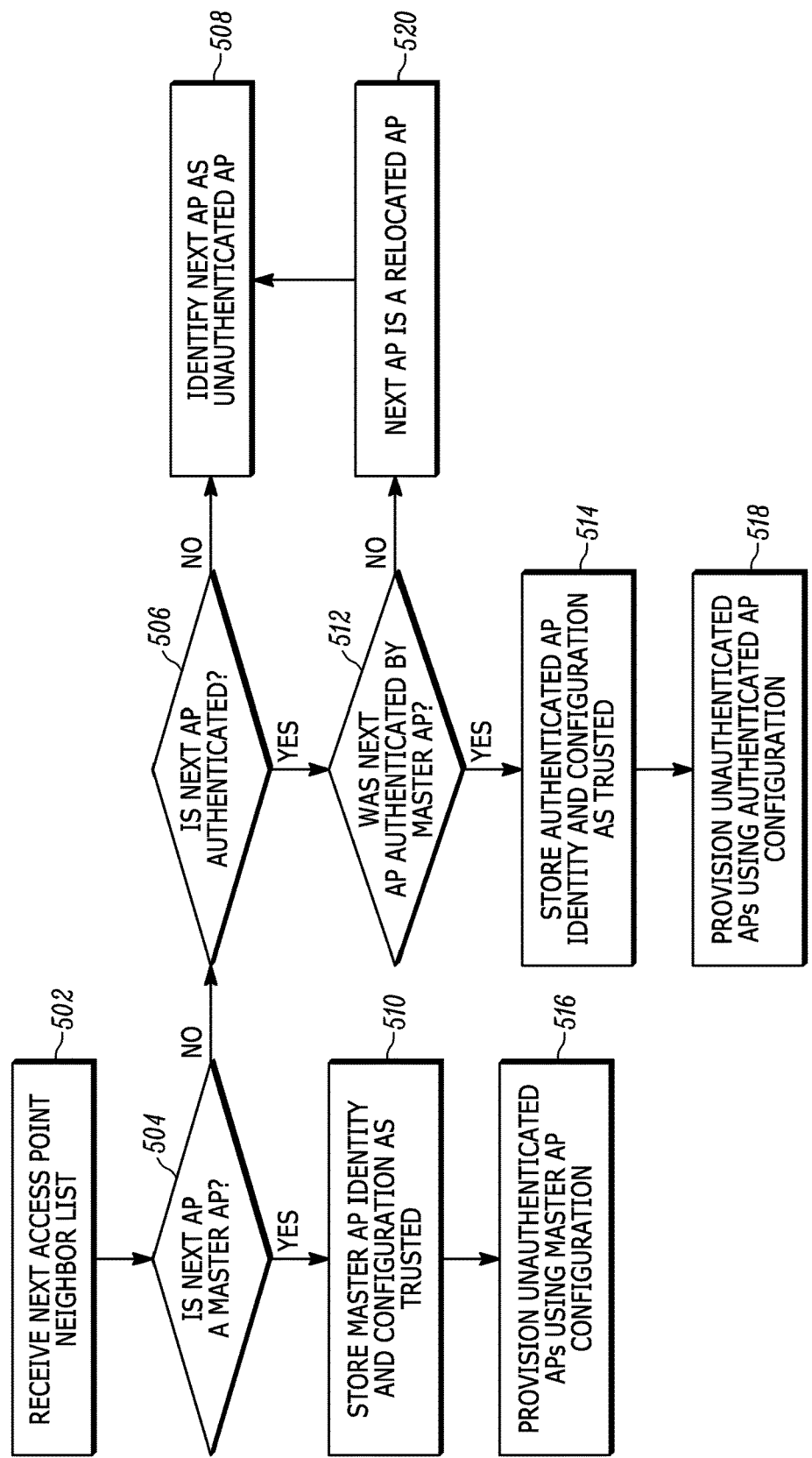
FIG. 5 is a flowchart depicting a third method, in accordance with some embodiments.

FIG. 5 is a flowchart depicting a third method, in accordance with some embodiments. Indeed, FIG. 5 is a flowchart illustrating operation of a method 500 that involves identifying a master access point or another authenticated access point to use to authenticate an unauthenticated access point. The method 500 may be performed as access-point neighbor lists are received by a cloud-based WLAN-management service such as the cloud-based WLAN-management service 140 of FIG. 1. In an example embodiment, the method 500 is carried out responsive to each received access-point neighbor list before the neighbor list is analyzed to authenticate and provision an unauthenticated access point.

Referring to FIG. 5, at step 502, an access-point neighbor list (referred to in FIG. 5 as a "next access-point neighbor list") is received at the cloud-based WLAN-management service 140. A check is made at decision block 504 to determine whether the access point that sent the received next access-point neighbor list is a master access point. The cloud-based WLAN-management service 140 may check whether the sending access point is a master access point by reference to configuration parameters that may be part of the access-point identifier in the access-point neighbor list. The configuration parameters may include, as an example, a serial number or a MAC address of the access point.

In this example, the cloud-based WLAN-management service 140 was used to configure the master access point and would therefore be able to match the serial number or MAC address contained in the neighbor list with a log or database entry identifying the master access point by serial number, MAC address, and/or the like. The configuration parameters may include any other similar type of identifier that the cloud-based WLAN-management service 140 may be designed to refer to in order to identify the access point sending the neighbor list as being the master access point for a given group. In one embodiment, a type of key may be associated with the serial number or MAC address of the master access point, and then communicated in the configuration parameters of the access point.

If the access point that sent the next access-point neighbor list received in step 502 is a master access point, the identity and configuration of the sending access point is stored as the master access point at step 510. The master access point may then be used to provision unauthenticated access points using the master access point configuration at step 516. For example, the master access point may be the first access point referenced above in step 402 in the methods described with reference to FIGS. 4A and 4B.

If the access point that sent the next access-point neighbor list received in step 502 is not a master access point, decision block 506 checks whether the sending access point has already been authenticated. Decision block 506 may perform the check for an authenticated access point by reference to the configuration parameters communicated to identify the sending access point. For example, the configuration parameters may indicate that the access point may have been previously used in another WLAN. One indicator may be an SSID in the configuration parameters that identifies a WLAN and is not a default or factory setting. Another indicator may be a DHCP server configuration that appears to be valid, or client-IP assignment modes that are not default or factory settings. A cloud-based WLAN-management service may configure a pattern of configuration parameter settings that may be checked against those of an access point to indicate if the access point has been previously authenticated. And certainly other example implementations could be listed here.

If it is determined that the sending access point had previously been authenticated, decision block 512 checks whether the authentication was performed using the configuration parameters of a master access point managed by the cloud-based WLAN-management service 140. As examples, the cloud-based WLAN-management service 140 may check the configuration parameters of the sending access point against those of a previously identified master access point, or against those of a listing of master access points that may be maintained by the cloud-based WLAN-management service 140.

If at decision block 512, the sending (and previously authenticated) access point has configuration parameters that match a master access point, the sending access point is determined to be trusted. The authenticated access point identity and configuration are stored as trusted at step 514 and may be used to provision unauthenticated access points at step 518. If at decision block 512, the sending access point has configuration parameters that do not match a master access point, the sending access point is deemed to have been (i) previously authenticated for another WLAN and (ii) relocated to operate in the current WLAN at step 520. The relocated access point may then be identified as unauthenticated at step 508 and provisioned as described herein. If at decision block 506, the sending access point is determined to not be an authenticated access point, the sending access point is identified at step 508 as an unauthenticated access point that may be provisioned as described herein.

Figure 6:
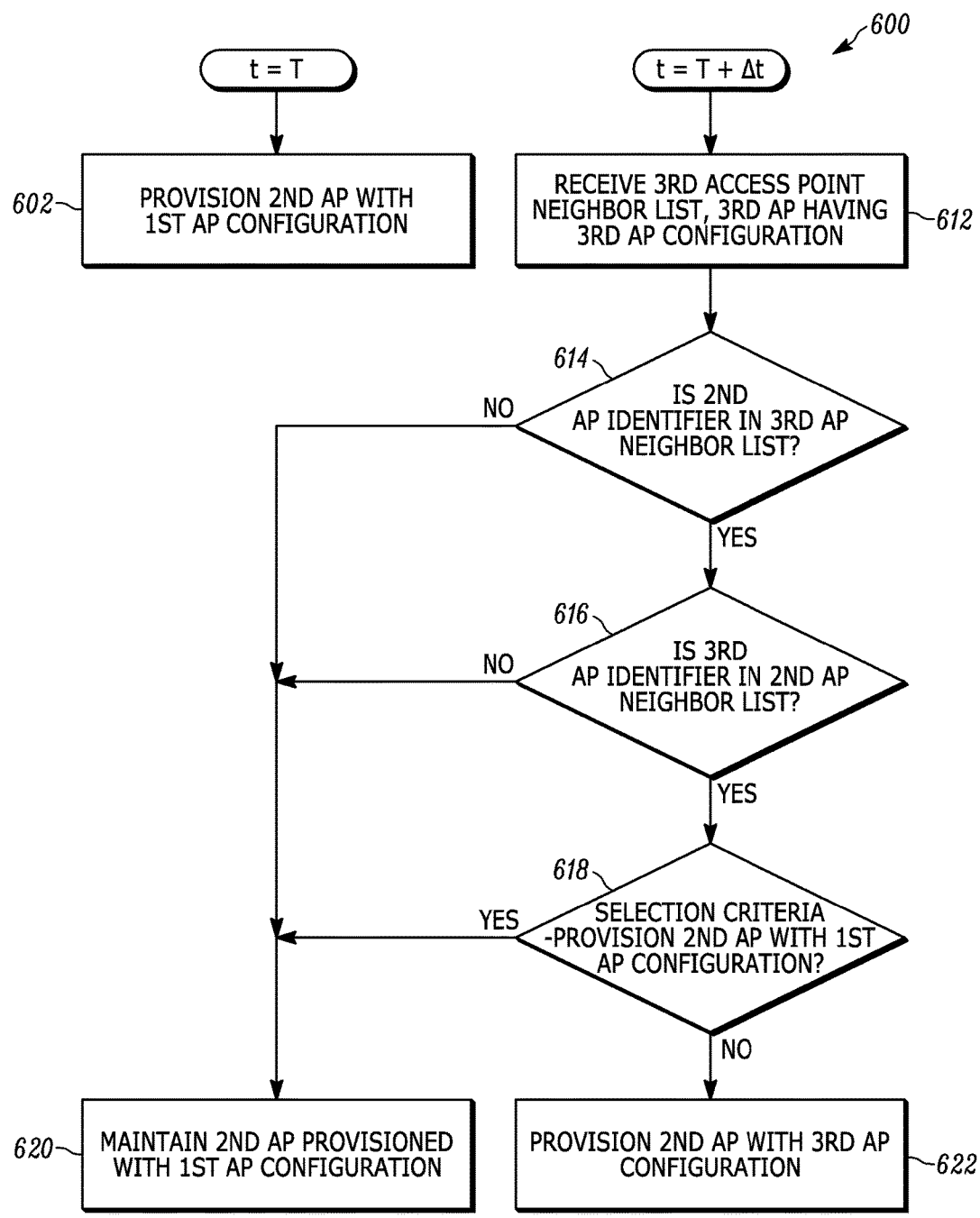
FIG. 6 is a flowchart depicting a fourth method, in accordance with some embodiments.

FIG. 6 is a flowchart depicting a fourth method, in accordance with some embodiments. Indeed, FIG. 6 is a flowchart of a method 500 that involves provisioning unauthenticated access points in accordance with some embodiments. The method 600 pertains to a situation in which (i) the identifier of an access point that is to be provisioned is included in the neighbor list of more than one previously configured access point and (ii) the neighbor list of the access point to be provisioned includes identifiers of both of those previously configured access points.

In the example that is depicted in FIG. 6, the process 400 that is illustrated in the flowchart of FIG. 4A is performed at time t=T, and concludes with the second access point being provisioned with the first-access-point configuration at step 602, which corresponds to step 410 of the method 400 of FIG. 4A. The first access point is deemed trusted as either a master access point or some other previously authenticated access point. The first access point may be deemed trusted using a process such as the method 500 described above with reference to FIG. 5. At time t=T+Δt, a third access point neighbor list is received by the cloud-based WLAN-management service 140, as shown at step 612. In the example depicted in FIG. 6, the third access point is a previously configured access point having a third-access-point configuration that is different from the first-access-point configuration.

At decision block 614, the third access point neighbor list is checked to determine whether it contains the second-access-point identifier. If the third-access-point neighbor list does not contain the second-access-point identifier, the second access point is provisioned with the first-access-point configuration at step 620. If at decision block 614, the third-access-point neighbor list does contain the second-access-point identifier, the second-access-point neighbor list is checked to determine whether it contains the third-access-point identifier at decision block 616. If the second-access-point neighbor list does not contain the third-access-point identifier, the second access point is provisioned with the first-access-point configuration at step 620. If at decision block 616, the second-access-point neighbor list contains the third-access-point identifier, selection criteria is used at decision block 618 to determine whether the unauthenticated second access point should be configured using the first-access-point configuration (or rather the third-access-point configuration).

The selection criteria that is used by the cloud-based WLAN-management service 140 at decision block 618 may refer to signal-strength data that may be communicated with the configuration parameters; in an example implementation, the first-access-point configuration parameters are used if the signal-strength data indicates that the second access point received a neighbor list from the first access point at a higher signal strength than that associated with the neighbor list that the second access point received from the third access point.

In some instances, the second access point may transmit data indicating that the second access point received a neighbor list from either the first or third access point via a wired connection (e.g., via an LLDP message as described herein) and received a neighbor list from the other of the first and third access points via a wireless beacon. In some embodiments, this is a sufficient criterion for choosing to provision the second access point with the access-point configuration that is associated with the master access point from which the second access point received a neighbor list over a wired connection. And certainly numerous other examples of access-point-configuration selection criteria could be listed here.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for automatically authenticating and provisioning access points, the method comprising:
   receiving a first-access-point neighbor list from a first access point, the first access point having a first-access-point configuration;
   receiving a second-access-point neighbor list from a second access point;
   making a first determination that the first-access-point neighbor list includes an identifier of the second access point;
   making a second determination that the second-access-point neighbor list includes an identifier of the first access point; and
   responsive to making both of the first and second determinations, provisioning the second access point with the first-access-point configuration of the first access point.

2. The method of claim 1, wherein making the matching determination further comprises making a determination that the first access point is an authenticated access point.

3. The method of claim 2, wherein making the determination that the first access point is an authenticated access point comprises making a determination that the first access point is a master access point.

4. The method of claim 1, wherein the first-access-point configuration contains one or more of a service set identifier (SSID), a wireless local area network (WLAN) security configuration, an operating frequency band, a dynamic host configuration protocol (DHCP) server configuration, a client-address assignment mode, a WLAN-rate-limiting setting, a virtual local area network (VLAN) configuration, a firewall configuration, a network address translation (NAT) configuration, an application-visibility configuration, a wireless-radio configuration, a physical-port configuration, a radio-frequency-(RF)-management configuration, a certificate configuration, and an Internet Protocol (IP) security (IPSec) configuration.

5. The method of claim 1, wherein making the matching determination further comprises making a determination that the second access point is an unauthenticated access point.

6. The method of claim 1, wherein making the matching determination further comprises making a determination that the second access point is a relocated access point.

7. The method of claim 1, wherein the neighbor lists are wired-network-based neighbor lists.

8. The method claim 1, wherein the neighbor lists are wireless-beacon-based neighbor lists.

9. The method of claim 8, further comprising:
   receiving a third-access-point neighbor list from a third access point, the third access point having a third-access-point configuration, wherein the third-access-point neighbor list includes an identifier of the second access point, and wherein the second-access-point neighbor list includes an identifier of the third access point,
   wherein making the matching determination further comprises selecting, based on one or more selection criteria, the first-access-point configuration over the third-access-point configuration for provisioning the second access point.

10. The method of claim 9, wherein the one or more selection criteria comprises signal-strength data.

11. The method of claim 9, wherein the one or more selection criteria comprises information conveyed over at least one wired network connection.

12. The method of claim 1, wherein making the matching determination further comprises confirming that neither the first access point nor the second access point is a rogue access point.

13. A system for automatically authenticating and provisioning access points, the system comprising:
   a communication interface configured to:
      receive a first-access-point neighbor list from a first access point, the first access point having a first-access-point configuration; and
      receive a second-access-point neighbor list from a second access point and a processor configured to
      make a first determination that the first-access-point neighbor list includes an identifier of the second access point;
      make a second determination that the second-access-point neighbor list includes an identifier of the first access point; and
      responsive to making both of the first and second determinations, provision the second access point with the first-access-point configuration of the first access point.

* * * * *